(12) United States Patent
Fujimatsu et al.

(10) Patent No.: US 9,191,633 B2
(45) Date of Patent: Nov. 17, 2015

(54) TRACKING ASSISTANCE DEVICE, TRACKING ASSISTANCE SYSTEM AND TRACKING ASSISTANCE METHOD

(71) Applicant: Panasonic Corporation, Osaka (JP)

(72) Inventors: Takeshi Fujimatsu, Kanagawa (JP); Sonoko Hirasawa, Kanagawa (JP); Hiroyuki Yamamoto, Ishikawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/326,510

(22) Filed: Jul. 9, 2014

(65) Prior Publication Data

US 2015/0015718 A1 Jan. 15, 2015

(30) Foreign Application Priority Data

Jul. 11, 2013 (JP) ................................ 2013-145286

(51) Int. Cl.
*H04N 7/18* (2006.01)
*H04N 5/232* (2006.01)

(52) U.S. Cl.
CPC ..................................... *H04N 7/181* (2013.01)

(58) Field of Classification Search
CPC ..................................................... H04N 7/181
USPC ......................................................... 348/159
See application file for complete search history.

(56) References Cited

U.S. PATENT DOCUMENTS

| | | | |
|---|---|---|---|
| 7,746,380 B2 | 6/2010 | Maruya et al. | |
| 8,284,255 B2 | 10/2012 | Yokomitsu | |
| 8,432,450 B2 | 4/2013 | Niem et al. | |
| 2004/0257444 A1 | 12/2004 | Maruya et al. | |
| 2008/0225119 A1 | 9/2008 | Murata | |

(Continued)

FOREIGN PATENT DOCUMENTS

| CN | 1574961 | 2/2005 |
|---|---|---|
| CN | 102496001 | 6/2012 |

(Continued)

OTHER PUBLICATIONS

Office Action from State Intellectual Property Office (SIPO) in Chinese Patent Application No. 201410332105.7, dated Jul. 3, 2015.

(Continued)

*Primary Examiner* — Behrooz Senfi
(74) *Attorney, Agent, or Firm* — Greenblum & Bernstein, P.L.C.

(57) ABSTRACT

A tracking assistance device for assisting a monitoring person in tracking a moving object by displaying on a display device a monitoring screen in which display views for displaying in real time captured images taken by respective cameras are arranged on a map image representing a monitored area in accordance with an actual arrangement of the cameras, includes: a target-to-be-tracked setting unit that, in response to an input operation performed by the monitoring person on one of the display views to designate a moving object to be tracked, sets the designated moving object as a target to be tracked; a prediction unit that predicts a next display view in which the moving object set as the target to be tracked will appear next based on tracing information obtained by processing the captured images; and a display view indicating unit that indicates the next display view on the monitoring screen.

6 Claims, 12 Drawing Sheets

(56) References Cited

U.S. PATENT DOCUMENTS

| | | |
|---|---|---|
| 2010/0201821 A1 | 8/2010 | Niem et al. |
| 2013/0129160 A1 | 5/2013 | Yamada et al. |
| 2014/0037147 A1 | 2/2014 | Yoshio et al. |
| 2014/0050455 A1* | 2/2014 | Ni .................. H04N 9/8227 386/224 |
| 2014/0222501 A1 | 8/2014 | Hirakawa et al. |

FOREIGN PATENT DOCUMENTS

| | | |
|---|---|---|
| DE | 112005000213 | 8/2012 |
| JP | 2003-009142 | 1/2003 |
| JP | 2005-012415 | 1/2005 |
| JP | 2006-146378 | 6/2006 |
| JP | 2007-272732 | 10/2007 |
| JP | 2009-098774 | 5/2009 |
| JP | 2010-268186 | 11/2010 |
| WO | 2009/062775 | 5/2009 |

OTHER PUBLICATIONS

U.S. Appl. No. 14/319,042 to Kazuhiko Iwai, filed Jun. 30, 2014.
U.S. Appl. No. 14/326,690 to Sonoko Hirasawa et al., filed Jul. 9, 2014.
U.S. Appl. No. 14/326,683 to Takeshi Fujimatsu et al., filed Jul. 9, 2014.
U.S. Appl. No. 14/320,693 to Sumio Yokomitsu et al., filed Jul. 1, 2014.
U.S. Appl. No. 14/344,636 to Takeshi Fujimatsu et al., filed Mar. 13, 2014.
Office Action from German Patent and Trade Mark Office (DPMA) in German Patent Application No. 102014213553.2, dated is Oct. 13, 2014.

* cited by examiner

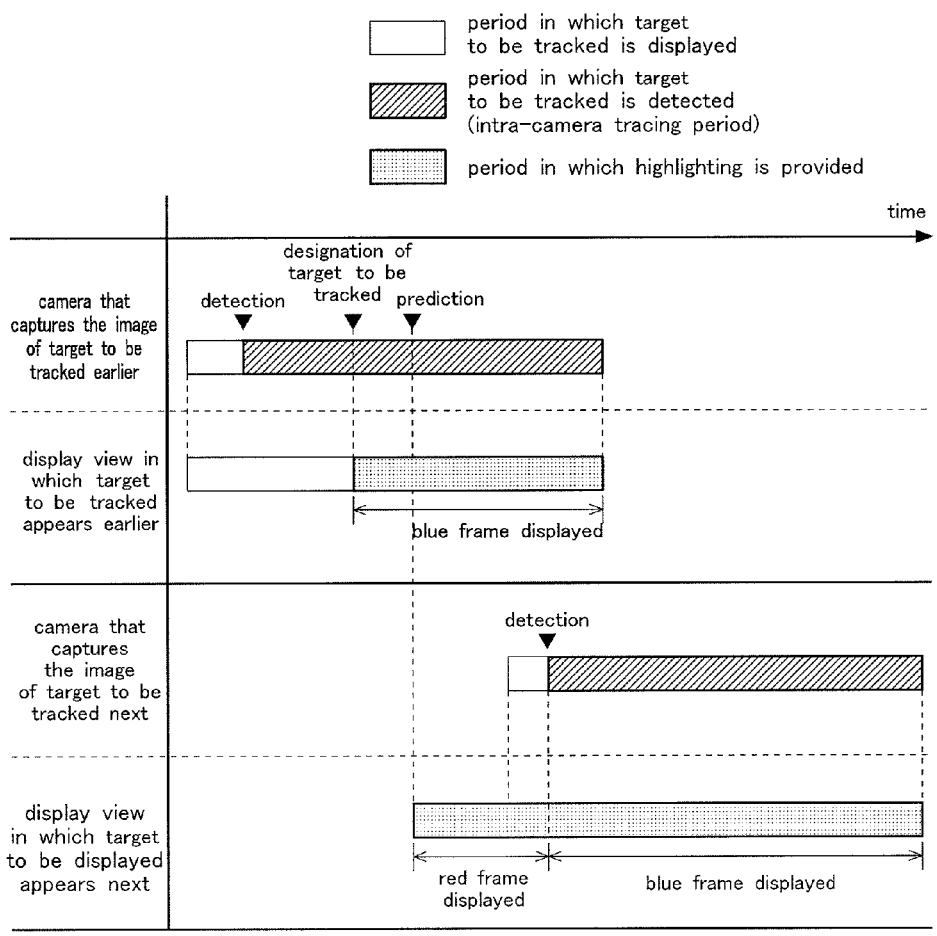

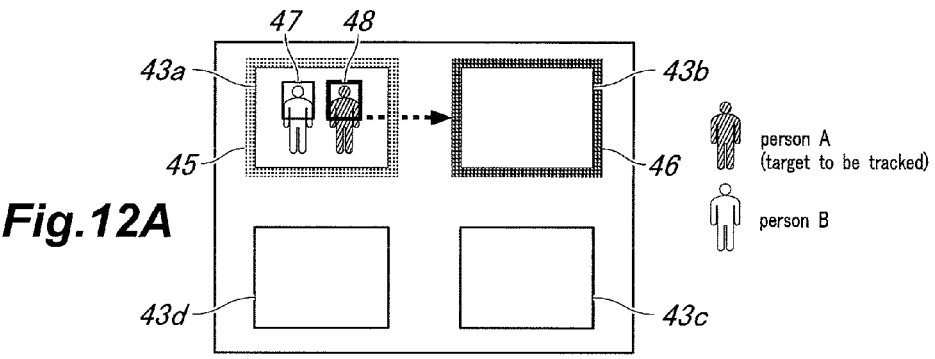
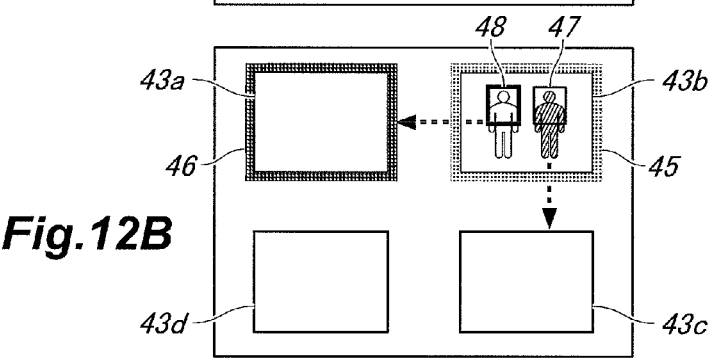
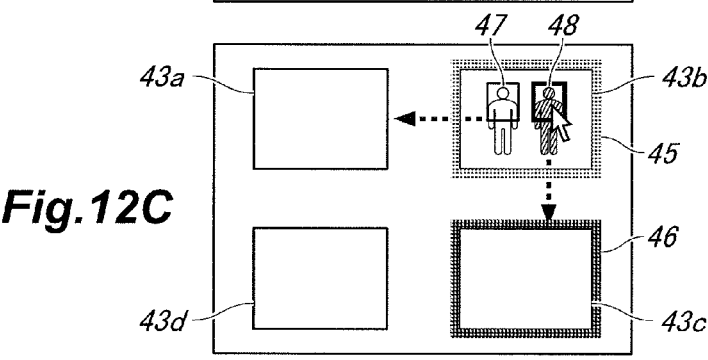
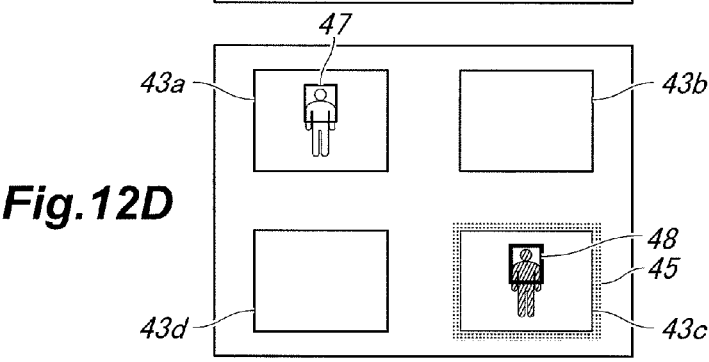

TRACKING ASSISTANCE DEVICE, TRACKING ASSISTANCE SYSTEM AND TRACKING ASSISTANCE METHOD

TECHNICAL FIELD

The present invention relates to a tracking assistance device, a tracking assistance system and a tracking assistance method for assisting a monitoring person in performing a task of tracking a moving object to be tracked by displaying on a display device a monitoring screen in which multiple display sections are arranged to display in real time captured images taken by respective cameras.

BACKGROUND OF THE INVENTION

Some of the widely used monitoring systems include multiple cameras set up in a monitored area and a monitor adapted to display a monitoring screen in which multiple display sections are arranged to display in real time captured images taken by respective cameras so that a monitoring person can monitor the monitored area. In such a monitoring system, if the monitoring person finds a suspicious person in the monitoring screen, the monitoring person will keep track of the suspicious person while watching the multiple display sections in the monitoring screen to see how the person behaves thereafter.

In a case where the monitoring person keeps track of a person while watching the multiple display sections in the monitoring screen as mentioned above, the monitoring person is required to determine the display section in which the person will appear (or be displayed) next from the direction of movement of the person being monitored, but if it took much time to determine the next display section, the monitoring person may lose sight of the person to be monitored. Therefore, a configuration to reduce the burden of the monitoring person and allow tracking of a person to be carried out smoothly is demanded.

With regard to such a demand, a technology is conventionally known in which based on information such as a direction of movement of a person being monitored, the camera that will next capture the image of the person is predicted, and the display section displaying the captured image taken by this camera is displayed adjacent to the display section in which the person being monitored currently appears (refer to JP2005-012415A). A technology is also known in which a monitoring screen is displayed such that the monitoring screen includes a map image representing a monitored area, on which images representing cameras (camera marks) and display sections for displaying the captured images taken by the cameras are arranged (refer to JP2010-268186A).

In a case where the camera that will next capture the image of the person being monitored is predicted as in the technology disclosed in JP2005-012415A, if a failure occurs in detecting the direction of movement of the person being monitored or the like, a wrong camera may be predicted, and this may cause the monitoring person to lose sight of the person being monitored. Thus, a configuration which, upon occurrence of a failure in detecting the direction of movement of the like, makes an appropriate correction in accordance with a correction instruction input by the monitoring person is demanded.

With regard to such a demand, a technology is known in which a tracing device is configured to perform a tracing process using a point of interest set on a moving object and, if the tracing of the point of interest becomes difficult, change the point of interest in accordance with a correction instruction input by a user (monitoring person) to thereby continue the tracing process (refer to JP2007-272732A).

SUMMARY OF THE INVENTION

In the technique disclosed in JP2005-012415A, since the camera that will next capture the image of the person being monitored (next camera) is predicted and the captured image taken by this camera is displayed, the burden of the monitoring person may be reduced. However, if there is another person in addition to the person being monitored in the captured image taken by the camera that is currently capturing the image of the person being monitored, the prediction of the next camera may be performed based on the direction of movement of the other person. In such a case, the prediction of the next camera is not made correctly, and this may result in the monitoring person losing sight of the person being monitored.

On the other hand, in the technology disclosed in JP2010-268186A, the positional relationship between the cameras on the map image enables the monitoring person to predict to a certain extent the display section in which the person being monitored will appear next, and thus, the burden of the monitoring person can be reduced somewhat. However, in a case where many display sections are arranged in the screen in correspondence with the number of cameras installed, it is difficult to determine the next display section promptly and exactly from among the many display sections, and thus, the burden of the monitoring person may still be high and there remains a high chance that the person being monitored can be lost from tracking.

Further, in the technology disclosed in JP2007-272732A, even under circumstances in which it is difficult for the tracing device to perform a tracing process, with a help of the monitoring person, the tracing process can be continued without interruption. However, this prior art technology only relates to an intra-camera tracing process performed based on the captured images taken by a single camera. On the other hand, an error can occur in an inter-camera tracing process which associates the tracing information obtained by the intra-camera tracing process for one camera with the tracing information obtained by the intra-camera tracing process for another, and if an error actually occurs in the inter-camera tracing process, a change of the person to be tracked may inadvertently occur. The prior art technology does not provide any effective measure to deal with an error that may occur in the inter-camera tracing process.

The present invention is made to solve such problems of the prior art, and a primary object of the present invention is to provide a tracking assistance device, a tracking assistance system and a tracking assistance method configured to properly perform an assistance process to reduce the burden of a monitoring person in tracking a person being monitored while watching captured images taken by multiple cameras and displayed in the monitoring screen, so that the monitoring person can continue tracking without losing sight of the person being monitored. Further object of the present invention is to enable the tracking to be performed continuously even when an interruption or error occurs in a tracing process performed by a tracing device.

To achieve the foregoing object, a first aspect of the present invention provides a tracking assistance device for assisting a monitoring person in performing a task of tracking a moving object to be tracked by displaying on a display device a monitoring screen in which a plurality of display views for displaying in real time captured images taken by respective cameras are arranged on a map image representing a monitored area in accordance with an actual arrangement of the cameras, including: a target-to-be-tracked setting unit that, in response to an input operation performed by the monitoring person on one of the display views to designate a moving object to be tracked, sets the designated moving object as a target to be tracked; a target-to-be-tracked indicating unit that, based on tracing information obtained by processing the captured images, indicates the moving object set as the target to be tracked in each of the display views in which the moving object set as the target to be tracked appears; a prediction unit that predicts a next display view in which the moving object set as the target to be tracked will appear next based on the tracing information; and a display view indicating unit that indicates the next display view predicted by the prediction unit on the monitoring screen, wherein the target-to-be-tracked indicating unit provides first highlighting to highlight a moving object frame associated with the moving object set as the target to be tracked and the display view indicating unit provides second highlighting to highlight a display frame associated with the next display view predicted by the prediction unit.

According to the this structure, when the monitoring person keeps in real time track of the moving object being monitored while watching the captured images taken by multiple cameras and displayed in the monitoring screen, the monitoring person may have less difficulty in finding the next display view from among the multiple display views, and thus, the burden of the monitoring person performing the tracking task can be reduced considerably and the tracking can be continued without losing sight of the moving object designated as the target to be tracked. Further, even when multiple moving objects appear in a display view, the target to be tracked can be specified uniquely, and thus, it is possible to avoid erroneously indicating the next display view.

In this case, the camera that will next take the image of the moving object set as the target to be tracked, namely, the display view in which the moving object set as the target to be tracked will appear next can be predicted from the direction of movement of the moving object and the positional relationship between the moving object and the imaging region of each camera.

In a second aspect of the present invention, the tracking assistance device further includes a control unit that, in a state where a moving object is set as the target to be tracked, when the monitoring person, noting that indication of the target to be tracked by the target-to-be-tracked indicating unit is incorrect, performs an input operation, causes the target-to-be-tracked setting unit to perform a process of changing the moving object set as the target to be tracked.

According to this structure, the moving object set as the target to be tracked is indicated on the monitoring screen, and the monitoring person can notice an error relating to the moving object set as the target to be tracked and perform an operation to designate the correct moving object as the target to be tracked to thereby change the moving object set as the target to be tracked, such that in the monitoring screen displayed thereafter, the moving object designated as the target to be tracked will appear in the predicted next display view without fail, and the tracking can be continued without loosing sight of the moving object designated as the target to be tracked. Further, when the moving object set as the target to be tracked is displayed in the predicted next display view, the monitoring person can promptly check the displayed moving object, and therefore, the monitoring person can promptly note incorrect setting of the target to be tracked, if any, and correct the setting of the target to be tracked without fail.

In this case, when the target-to-be-tracked setting unit performs a process of changing the moving object set as the target to be tracked, a process of reflecting the change of the target to be tracked on the tracing information, namely, a process of correcting the tracing information is performed.

In a third aspect of the present invention, when a moving object is set anew by the target-to-be-tracked setting unit as the target to be tracked, the display view indicating unit provides third highlighting to a display view in which the moving object set as the target to be tracked currently appears, such that the display view is distinguished from the other display views.

According to this structure, the monitoring person can easily find the display view in which the moving object set as the target to be tracked currently appears, and thus, the burden of the monitoring person performing the tracking task can be reduced.

In a fourth aspect of the present invention, there is provided a tracking assistance system for assisting a monitoring person in performing a task of tracking a moving object to be tracked by displaying on a display device a monitoring screen in which a plurality of display views for displaying in real time captured images taken by respective cameras are arranged on a map image representing a monitored area in accordance with an actual arrangement of the cameras, including: the cameras capturing images of the monitored area; the display device which displays the monitoring screen; and a plurality of information processing devices, wherein the plurality of information processing devices jointly include: a tracing processing unit that traces a moving object(s) detected from the captured images and generates tracing information of each moving object; a target-to-be-tracked setting unit that, in response to an input operation performed by the monitoring person on one of the display views to designate a moving object to be tracked, sets the designated moving object as a target to be tracked; a target-to-be-tracked indicating unit that, based on the tracing information obtained from the tracing processing unit, indicates the moving object set as the target to be tracked in each of the display views in which the moving object set as the target to be tracked appears; a prediction unit that predicts a next display view in which the moving object set as the target to be tracked will appear next based on the tracing information; and a display view indicating unit that indicates the next display view predicted by the prediction unit on the monitoring screen, wherein the target-to-be-tracked indicating unit provides first highlighting to highlight a moving object frame associated with the moving object set as the target to be tracked and the display view indicating unit provides second highlighting to highlight a display frame associated with the next display view predicted by the prediction unit.

According to this structure, similarly to the structure in the first aspect of the invention described above, when the monitoring person keeps in real time track of the moving object being monitored while watching the captured images taken by multiple cameras and displayed in the monitoring screen, the burden of the monitoring person performing the tracking task can be reduced considerably and the tracking can be continued without losing sight of the moving object designated as a target to be tracked.

In a fifth aspect of the present invention, there is provided a tracking assistance method for assisting a monitoring person in performing a task of tracking a moving object to be tracked by displaying on a display device a monitoring screen in which a plurality of display views for displaying in real time captured images taken by respective cameras are arranged on a map image representing a monitored area in accordance with an actual arrangement of the cameras, including: a step of setting, in response to an input operation performed by the monitoring person on one of the display views to designate a moving object to be tracked, the designated moving object as a target to be tracked; a step of indicating, based on tracing information obtained by processing the captured images, the moving object set as the target to be tracked in each of the display views in which the moving object set as the target to be tracked appears; a step of predicting a next display view in which the moving object set as the target to be tracked will appear next based on the tracing information; and a step of indicating the next display view predicted by the step of predicting on the monitoring screen, wherein the step of indicating the moving object set as the target to be tracked provides first highlighting to highlight a moving object frame associated with the moving object set as the target to be tracked and the step of indicating a next display view provides second highlighting to highlight a display frame associated with the next display view predicted by the step of predicting.

According to this structure, similarly to the structure in the first aspect of the invention described above, when the monitoring person keeps in real time track of the moving object being monitored while watching the captured images taken by multiple cameras and displayed in the monitoring screen, the burden of the monitoring person performing the tracking task can be reduced considerably and the tracking can be continued without losing sight of the moving object designated as a target to be tracked.

BRIEF DESCRIPTION OF THE DRAWINGS

Now the present invention is described in the following in terms of preferred embodiments thereof with reference to the appended drawings, in which:

FIG. 10 is an explanatory diagram showing temporal transition of states of frame images 45, 46 displayed in display views 43*a*-43*d* of the monitoring screen;

FIGS. 12A-12D are explanatory diagrams for explaining transition of states of the display views 43*a*-43*d* of the monitoring screen.

DETAILED DESCRIPTION OF THE PREFERRED EMBODIMENTS

In the following, embodiments of the present invention will be described with reference to the drawings. In the following description, the terms "tracking" and "tracing" having substantially the same meaning are coexistent. This is only for the sake of convenience of explanation. The term "tracking" is mainly used in the description of a configuration closely related to a monitoring person, while the term "tracing" is mainly used in the description of a configuration closely related to an internal function/process of the device.

Figure 1:
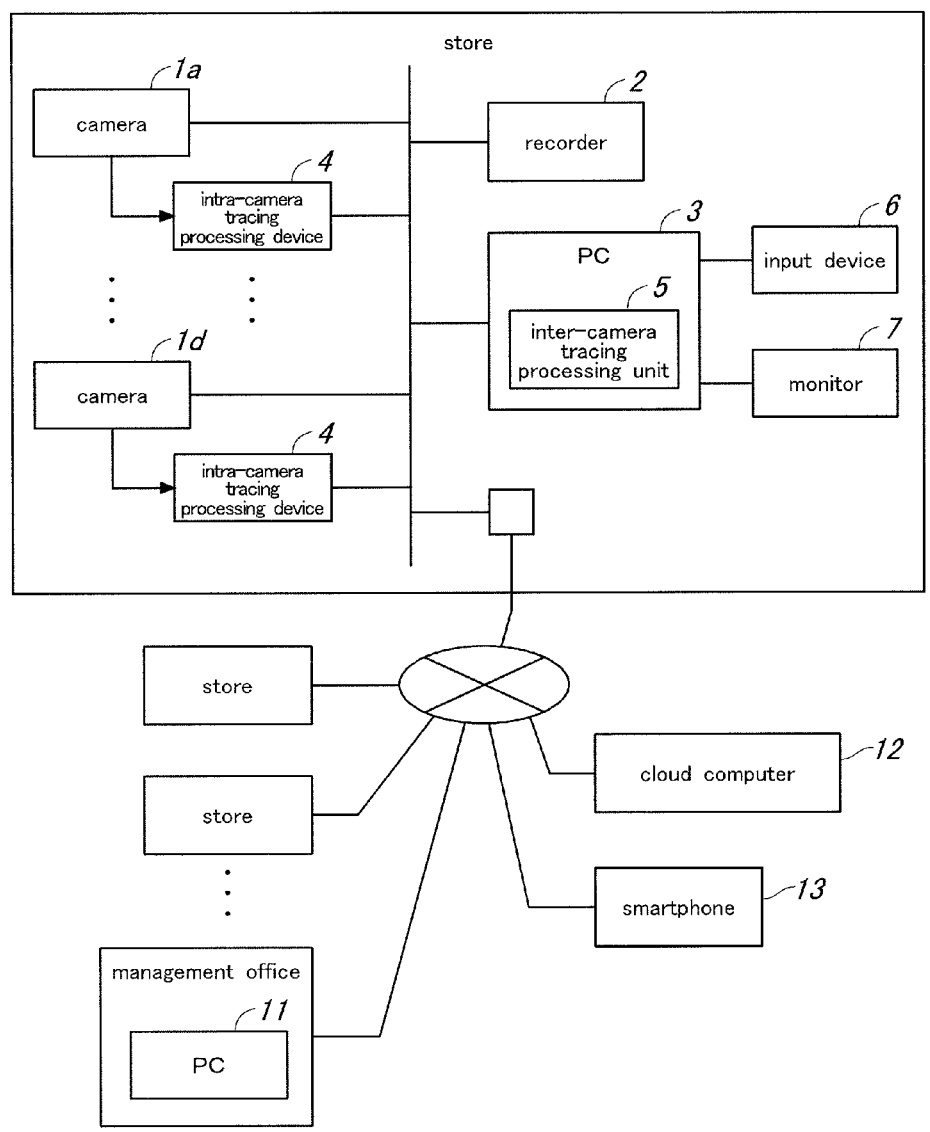
FIG. 1 is a diagram showing an overall configuration of a tracking assistance system according to an embodiment of the present invention.

FIG. 1 is a diagram showing an overall configuration of a tracking assistance system according to the present embodiment. This tracking assistance system is configured for use in a retail store such as a supermarket or the like, and includes cameras 1*a*-1*d*, a recorder (image recording device) 2, a PC (Personal Computer) (tracking assistance device) 3 and intra-camera tracing processing devices 4.

The cameras 1*a*-1*d* are mounted at appropriate positions in a store to capture images of a monitored area in the store, and image information obtained thereby is recorded in the recorder 2.

The PC 3 is connected with an input device 6 such as a mouse for the monitoring person to perform a variety of input operations, and a monitor (display device) 7 on which a monitoring screen is displayed. It is to be noted that the input device 6 and the monitor 7 may be embodied as a touch panel display.

The PC 3 is set up in a security station or the like of the store, such that the monitoring person (such as a security guard) can view the real-time images of an interior of the store taken by the cameras 1*a*-1*d* shown in the monitoring screen displayed on the monitor 7 or the past images of the interior of the store recorded in the recorder 2.

A PC 11 installed in a management office is also connected with a monitor not shown in the drawings, such that a user at the management office can check the situation in the store by viewing the real-time images of the interior of the store taken by the cameras 1*a*-1*d* or the past images of the interior of the store recorded in the recorder 2.

The intra-camera tracing processing devices 4 perform a process of tracing a person(s) (moving object) detected from the captured images taken by respective cameras 1*a*-1*d* and generating tracing information (intra-camera tracing information) for each person. This intra-camera tracing process may be performed by use of known image recognition technology (human detection technology, person tracking technology, etc.).

The PC 3 further includes an inter-camera tracing processing unit 5. The inter-camera tracing processing unit 5 performs a process of obtaining the intra-camera tracing information from the intra-camera tracing processing devices 4 and associating the persons detected from the captured images taken by the cameras 1*a*-1*d* by the intra-camera tracing process with one another, so that it is possible to continuously trace a person across the captured images taken by different ones of the multiple cameras 1*a*-1*d*.

In the present embodiment, each intra-camera tracing processing device 4 is configured to perform the intra-camera tracing process at all times independently of the PC 3. However, the tracing process may be performed in response to an instruction from the PC 3. Further, though it is preferred that each intra-camera tracing processing device 4 perform the tracing process for all persons detected from the captured images taken by the corresponding camera, the tracing process may be performed only with respect to the person designated as a target to be tracked and a person(s) who is highly related to this person.

Figure 2:
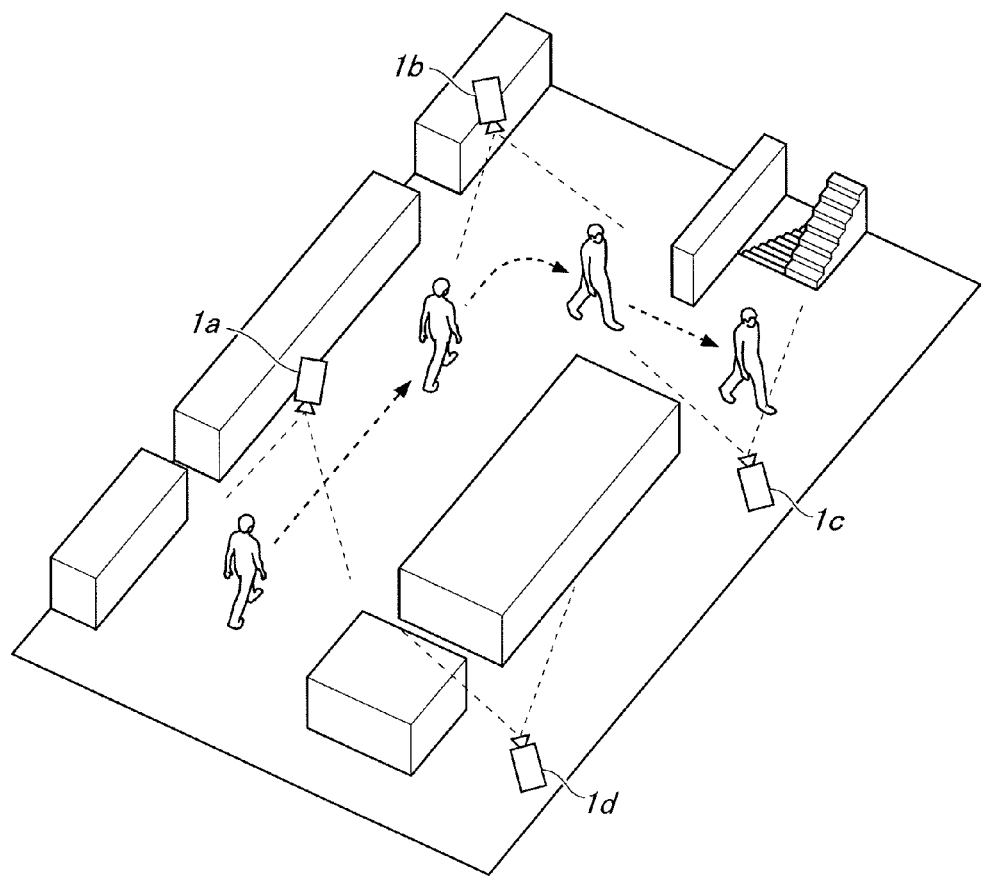
FIG. 2 is a perspective view showing an arrangement of cameras 1*a*-1*d* in a store.

FIG. 2 is a perspective view showing an arrangement of the cameras 1a-1d in the store. In the illustrated monitored area in the store, passages are provided between item display spaces, and the first to forth cameras 1a-1d are mounted to mainly capture images of these passages.

When a person moves through a passage, the image of the person is captured by one or more of the first to forth cameras 1a-1d, and the camera(s) capturing the image of the person changes along with the movement of the person. In the present embodiment, a description will be made of an example in which the person moves such that the image of the person is captured by the first to third cameras 1a-1c in the order of the first camera 1a, second camera 1b and third camera 1c, though the path of movement of the person is not limited to this example.

Figure 3:
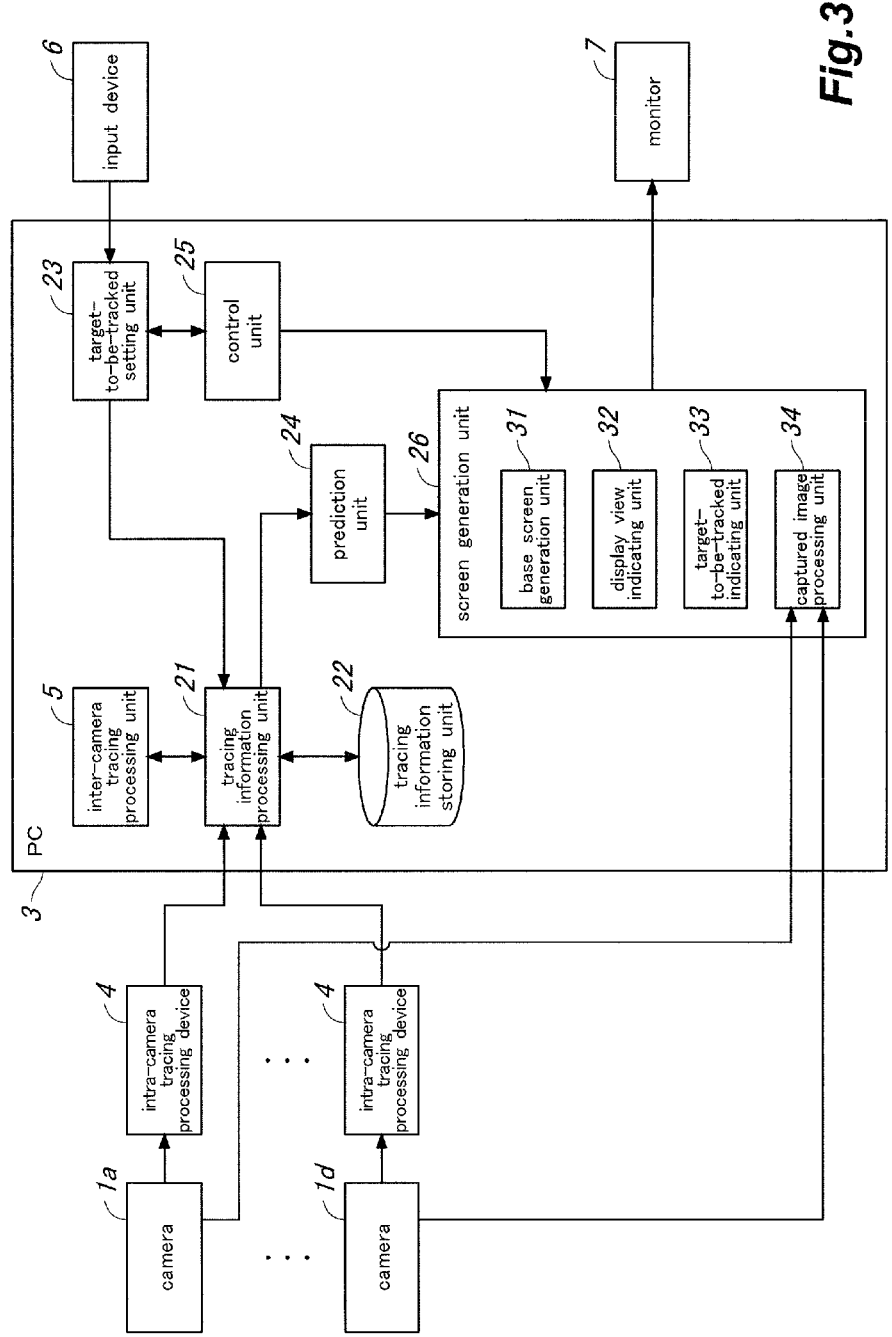
FIG. 3 is a functional block diagram schematically showing a configuration of a PC 3.

Next, a description will be given of the tracking assistance process performed by the PC 3 shown in FIG. 1. FIG. 3 is a functional block diagram schematically showing a configuration of the PC 3. FIGS. 4-8 are explanatory diagrams each showing a monitoring screen displayed on the monitor 7. First, an outline of the monitoring screen shown in FIGS. 4-8 will be explained.

In the monitoring screens shown in FIGS. 4-8, camera marks (images depicting cameras) 42 for respective cameras 1a-1d are arranged on a map image 41 representing the monitored area at locations in accordance with the actual arrangement of the cameras 1a-1d. Further, multiple display views (display sections) 43a-43d displaying in real time captured images taken by the respective cameras 1a-1d are arranged in the vicinity of the respective camera marks 42.

The camera marks 42 are displayed at angles to indicate the imaging direction of the respective cameras 1a-1d, whereby the monitoring person can roughly know the imaging regions of the cameras 1a-1d. The display views 43a-43d are arranged at locations substantially corresponding to the imaging regions of the respective cameras 1a-1d, whereby the monitoring person can roughly know which part of the monitored area represented by the map image 41 is displayed in each of the display views 43a-43d.

Further, in the monitoring screen, highlighting is provided to one of the display views 43a-43d in which the person set as the target to be tracked currently appears and another one of the display views 43a-43d in which the person set as the target to be tracked will appear next to distinguish them from the other ones of the display views 43a-43d. Specifically, in the present embodiment, as the highlighting, frame images 45, 46 which are colored with predetermined colors are displayed such that each is located on an outer periphery of one of the display views 43a-43d to be highlighted. Further, to distinguish between the one of the display views 43a-43d in which the person set as the target to be tracked currently appears and the one of the display views 43a-43d in which the person set as the target to be tracked will appear next, the frame images 45, 46 are colored with different colors; for example, the frame image 45 in blue color is displayed in association with the one of the display views 43a-43d in which the person set as the target to be tracked currently appears, while the frame image 46 in red color is displayed in association with the one of the display views 43a-43d in which the person set as the target to be tracked will appear next. It is to be noted that if the person set as the target to be tracked currently appears in multiple ones of the display views 43a-43d, multiple frame images 45 may be displayed simultaneously such that each of the multiple ones of the display views 43a-43d is displayed with a frame image 45.

Further, in the monitoring screen, each person detected in the captured images displayed in the display views 43a-43d is shown with a person detection frame 47. In addition, the person set as the target to be tracked is displayed with a person detection frame 48 indicating that the person is the target to be tracked. This person detection frame 48 is highlighted with a color (for example, green) to distinguish the person detection frame 48 from the person detection frames 47 shown in association with the other persons detected.

Thus, in the display views 43a-43d of the monitoring screen, the captured images taken by the corresponding cameras 1a-1d are displayed in real time. The monitoring person performs the task of tracking the person to be tracked while watching the display views 43a-43d, and the PC 3 executes a process to assist the monitoring person in performing the tracking task.

Next, a description will be given of each unit of the PC 3 shown in FIG. 3. The PC 3 includes, in addition to the inter-camera tracing processing unit 5, a tracing information processing unit 21, a tracing information storing unit 22, a target-to-be-tracked setting unit 23, a prediction unit 24, a control unit 25 and a screen generation unit 26.

The tracing information processing unit 21 performs a process of obtaining tracing information from the intra-camera tracing processing devices 4 and the inter-camera tracing processing unit 5 and storing the obtained tracing information in the tracing information storing unit 22. Further, when the target-to-be-tracked setting unit 23 performs a process of changing the person set as the target to be tracked, the tracing information processing unit 21 performs a process of correcting the tracing information relating to the persons pertaining to the changing. The tracing information corrected thereby is stored in the tracing information storing unit 22.

The target-to-be-tracked setting unit 23 performs a process of, in response to an input operation performed by the monitoring person on one of the display views 43a-43d in the monitoring screen to designate a person to be tracked, setting the designated person as the target to be tracked. This input operation of the monitoring person is performed using the input device 6 such as a mouse.

The prediction unit 24 performs a process of obtaining the tracing information relating to the person set as the target to be tracked from the intra-camera tracing processing device 4 and the inter-camera tracing processing unit 5 via the tracing information processing unit 21, and, based on the tracing information, predicting one of the display views 43a-43d in which the person set as the target to be tracked will appear next, namely, one of the cameras 1a-1d which will next capture the image of the person set as the target to be tracked. In this prediction process, the direction of movement of the person set as the target to be tracked and the positional relationship between the person set as the target to be tracked and the imaging region of each of the cameras 1a-1d are obtained from the tracing information, and based on the information obtained, one of the cameras 1a-1d that will next capture the image of the person set as the target to be tracked is predicted.

The control unit 25 conducts control such that, when, in a state where the person to be tracked has not been set (namely, no person is set as the target to be tracked), an input operation is performed by the monitoring person, the control unit 25 causes the target-to-be-tracked setting unit 23 to perform a process of newly setting a person as the target to be tracked, and, when, in a state where the person to be tracked has been set (namely, a person is set as the target to be tracked), the monitoring person, noting that indication of the target to be tracked by the target-to-be-tracked indicating unit 33 (later described) of the screen generation unit 26 is incorrect, performs an input operation, causes the target-to-be-tracked setting unit 23 to perform a process of changing the person set as the target to be tracked.

Specifically, when, in the state where no person is set as the target to be tracked, the monitoring person performs an input operation to designate a person to be tracked on one of the display views 43a-43d in the monitoring screen, the target-to-be-tracked setting unit 23 performs a process of newly setting the designated person as the target to be tracked. Further, when, in the state where a person has been set as the target to be tracked, the monitoring person performs an input operation to designate a person to be tracked on one of the display views 43a-43d in the monitoring screen, the target-to-be-tracked setting unit 23 performs a process of changing the person set as the target to be tracked to the designated person.

The screen generation unit 26 generates the monitoring screen (refer to FIGS. 4-8) to be displayed on the monitor 7, and includes a base screen generation unit 31, a display view indicating unit 32, a target-to-be-tracked indicating unit 33 and a captured image processing unit 34.

The base screen generation unit 31 performs a process of generating a base screen (background screen) in which the camera marks 42 for the respective cameras 1a-1d and blank frames (not including the captured images) of the multiple display views 43a-43d, in which the captured images taken by the respective cameras 1a-1d are to be displayed, are arranged on the map image representing the monitored area.

The display view indicating unit 32 performs a process of indicating, on the monitoring screen, one of the display views 43a-43d in which the person set as the target to be tracked will appear next (this display view may be referred to as a next display view), where the next display view is predicted by the prediction unit 24. Specifically, in the present embodiment, the one of the display views 43a-43d in which the person set as the target to be tracked will appear next is provided with highlighting to distinguish it from the other ones of the display views 43a-43d. Further, when the target-to-be-tracked setting unit 23 newly sets a person as the target to be tracked, the display view indicating unit 32 performs a process of providing highlighting to one of the display views 43a-43d in which the person set as the target to be tracked currently appears to distinguish it from the other ones of the display views 43a-43d.

Specifically, as the highlighting, frame images 45, 46 which are colored with predetermined colors are displayed such that each is located on an outer periphery of the one of the display views 43a-43d to be highlighted. Further, to enable the monitoring person to readily distinguish between the one of the display views 43a-43d in which the person set as the target to be tracked currently appears and the one of the display views 43a-43d in which the person set as the target to be tracked will appear next, the frame images 45, 46 are colored with different colors; for example, the frame image 45 in blue color is displayed in association with the one of the display views 43a-43d in which the person set as the target to be tracked currently appears, while the frame image 46 in red color is displayed in association with the one of the display views 43a-43d in which the person set as the target to be tracked will appear next.

The target-to-be-tracked indicating unit 33 performs a process of obtaining tracing information from the intra-camera tracing processing devices 4 and the inter-camera tracing processing unit 5 and, based on the tracing information, indicating the person set as the target to be tracked in each of the display views 43a-43d in which the person set as the target to be tracked appears. Specifically, in the present embodiment, the image of the person set as the target to be tracked that is displayed in the display views 43a-43d is provided with highlighting to distinguish the person from the other persons. More specifically, as the highlighting, the person set as the target to be tracked is shown with a person detection frame 48 that indicates that the person is the target to be tracked. This person detection frame 48 is highlighted with a color (for example, green) that can distinguish the person detection frame 48 from the person detection frames 47 shown in association with each person detected in the captured images.

The captured image processing unit 34 performs a process of embedding the captured images obtained from the cameras 1a-1d into the corresponding display views 43a-43d in the base screen generated by the base screen generation unit 31.

It is to be noted that the various units of the PC 3 shown in FIG. 3 are realized by executing programs for tracking assistance by the CPU of the PC3. These programs may be pre-installed in the PC 3 serving as an information processing device to embody a device dedicated to tracking assistance, or may be provided to a user in the form stored in an appropriate program recording medium as an application program that can be run on a general-purpose OS.

Next, a detailed description will be given of the monitoring screen shown in FIGS. 4-8 and operations performed by the monitoring person on the monitoring screen. FIG. 9 is a flowchart showing a procedure of processes performed by the various units of the PC 3 shown in FIG. 3 and operations performed by the monitoring person on the monitoring screen.

Figure 4:
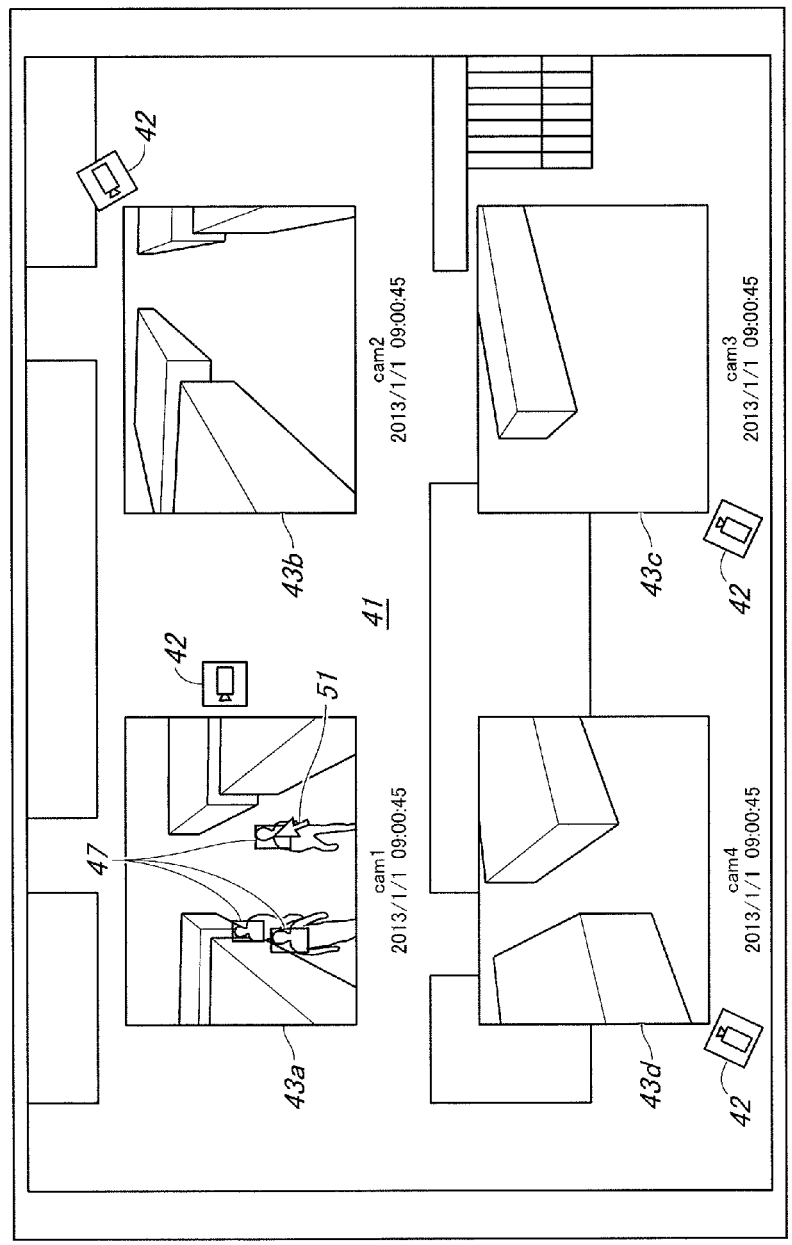
FIG. 4 is an explanatory diagram showing a monitoring screen where the person to be tracked has not been set.

First, when an operation to start real time monitoring is performed (ST101 of FIG. 9), a real time monitoring process is started and, as shown in FIG. 4, a monitoring screen in a state where the person to be tracked has not been set is displayed. In this monitoring screen, the monitoring person performs an operation to designate a person to be tracked (ST102 of FIG. 9). Specifically, the monitoring person uses the input device 6 such as a mouse to move a pointer 51 onto the image of the person desired to be tracked that appears in the captured image displayed in one of the display views 43a-43d (the first display view 43a in the example shown in FIG. 4) and performs an operation for selecting the person (a clicking operation in the case of a mouse).

In response to the monitoring person performing the operation on the monitoring screen to designate a person to be tracked as described above, the target-to-be-tracked setting unit 23 performs a process of newly setting the designated person as the target to be tracked. Subsequently, the prediction unit 24 performs a process of predicting one of the display views 43a-43d in which the person set as the target to be tracked will appear next (ST103 of FIG. 9).

Figure 5:
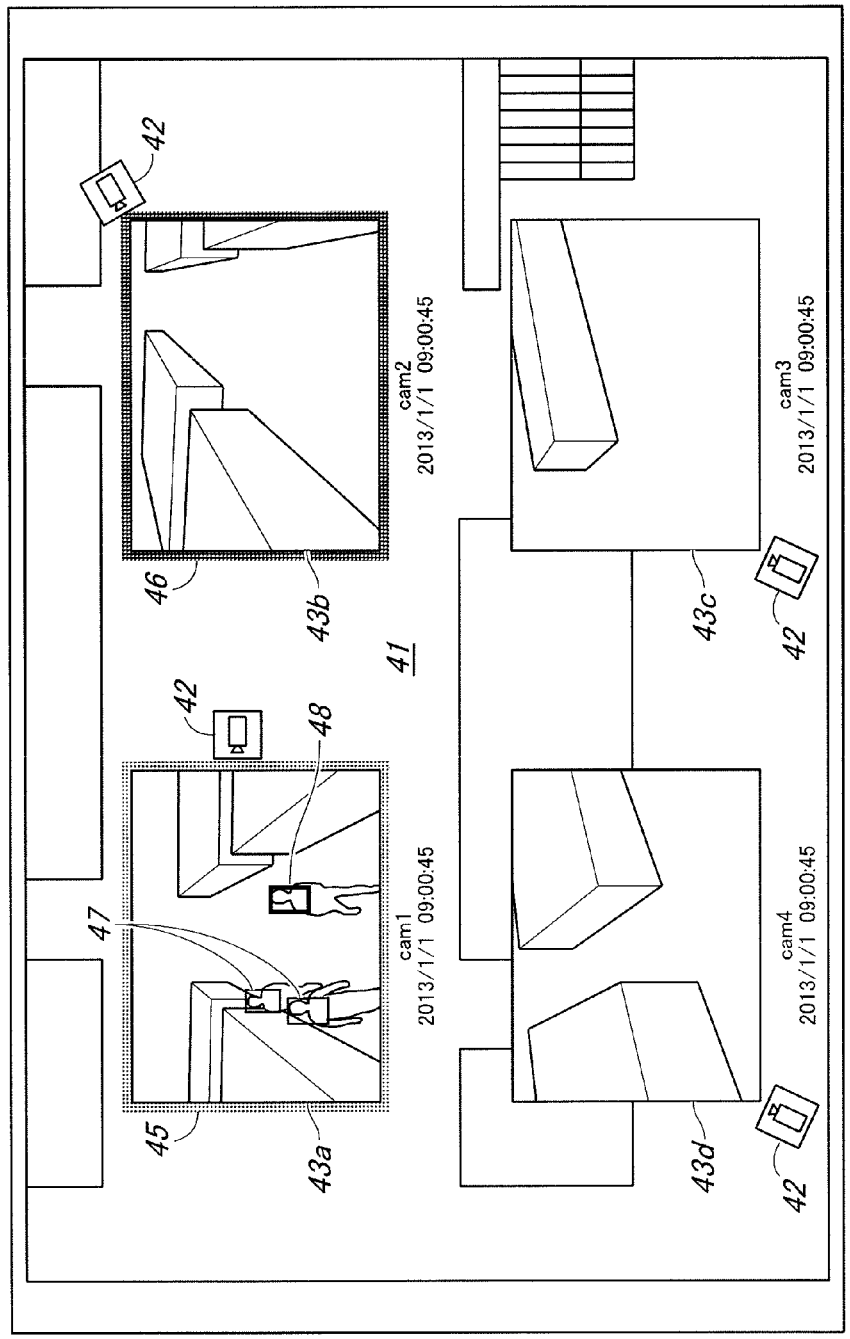
FIG. 5 is an explanatory diagram showing the monitoring screen where the person to be tracked has been set.

Then, the screen generation unit 26 performs a process of generating a monitoring screen in a state where the person to be tracked has been set, as shown in FIG. 5. At this time, the display view indicating unit 32 performs a process of displaying a frame image 46 on one of the display views 43a-43d in which the person set as the target to be tracked will appear next (the second display view 43b in the example shown in FIG. 5) as highlighting (ST104 in FIG. 9). Further, the display view indicating unit 32 performs a process of displaying a frame image 45 on one of the display views 43a-43d in which the person set as the target to be tracked currently appears (the first display view 43a in the example shown in FIG. 5) as highlighting.

Then, the control unit 25 performs a determination of whether an operation to correct the target to be tracked has been performed on the monitoring screen by the monitoring person. If the operation to correct the target to be tracked has not been performed (NO in ST105 of FIG. 9) and the person set as the target to be tracked leaves the imaging region of the one of the cameras 1*a*-1*d* that has been capturing the image of the person set as the target to be tracked such that the intra-camera tracing process relating to the person set as the target to be tracked terminates (ST107 of FIG. 9), the inter-camera tracing processing unit 5 obtains the intra-camera tracing information from the intra-camera tracing processing device 4 of one of the cameras 1*a*-1*d* corresponding to the next display view (one of the display views 43*a*-43*d* in which the person set as the target to be tracked will appear next) predicted by the prediction unit 24, and based on the intra-camera tracing information, performs a process of searching for the person designated as the target to be tracked in the captured images taken by the "next camera," which is one of the cameras 1*a*-1*d* corresponding to the next display view (ST108 of FIG. 9).

If the person designated as the target to be tracked is found in the captured images taken by the next camera (YES in ST109 of FIG. 9), the control flow goes back to the step where the prediction unit 24 predicts one of the display views 43*a*-43*d* in which the person set as the target to be tracked will appear next (ST103 of FIG. 9), and the above-described processes and operations are repeated.

Figure 6:
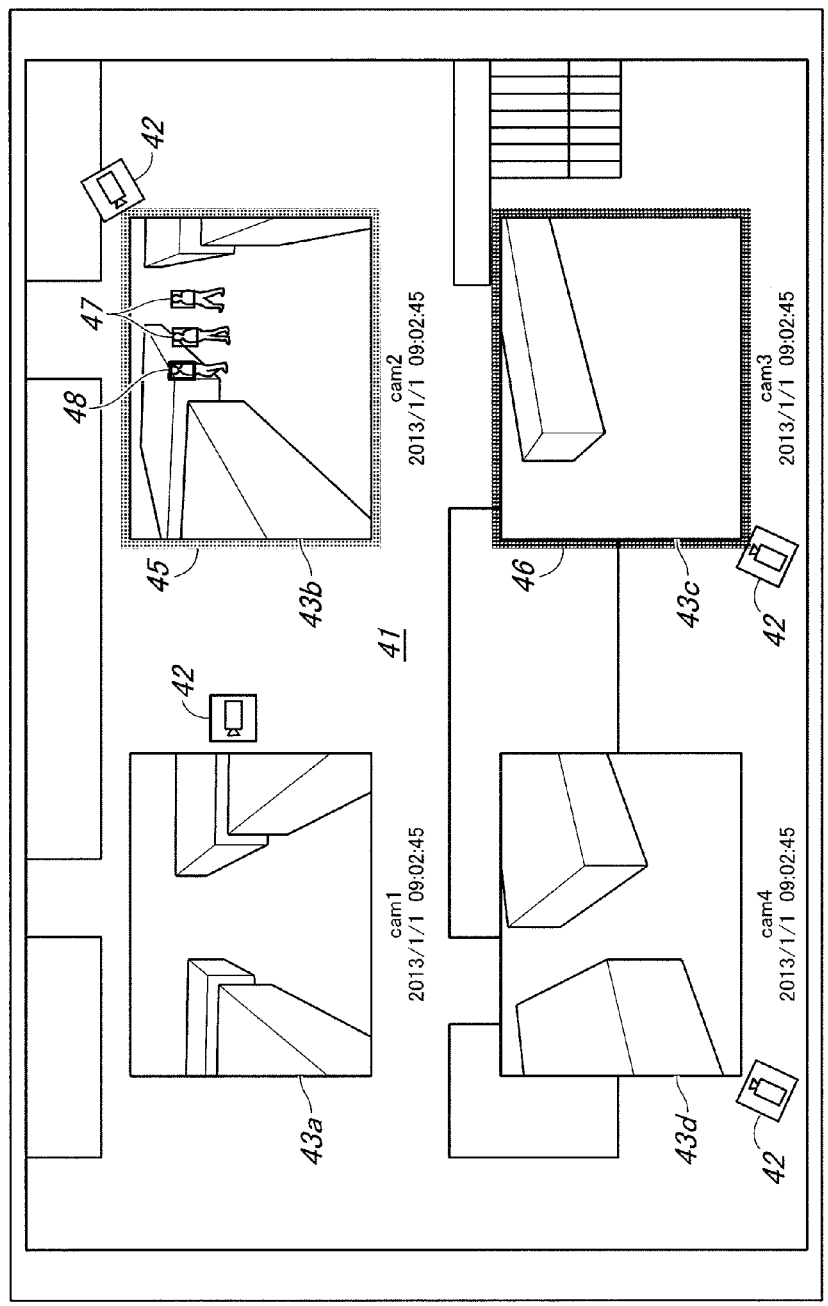
FIG. 6 is an explanatory diagram showing the monitoring screen when the person set as a target to be tracked has moved to appear in the next display view.

Thus, when the person set as the target to be tracked moves, as shown in FIG. 6, a monitoring screen in which the person set as the target to be tracked appears in one of the display views 43*a*-43*d* that was predicted to be the next display view (the second display view 43*b* in the example shown in FIG. 6) comes to be displayed. In this monitoring screen, the monitoring person checks whether the person set as the target to be tracked is correct.

Figure 7:
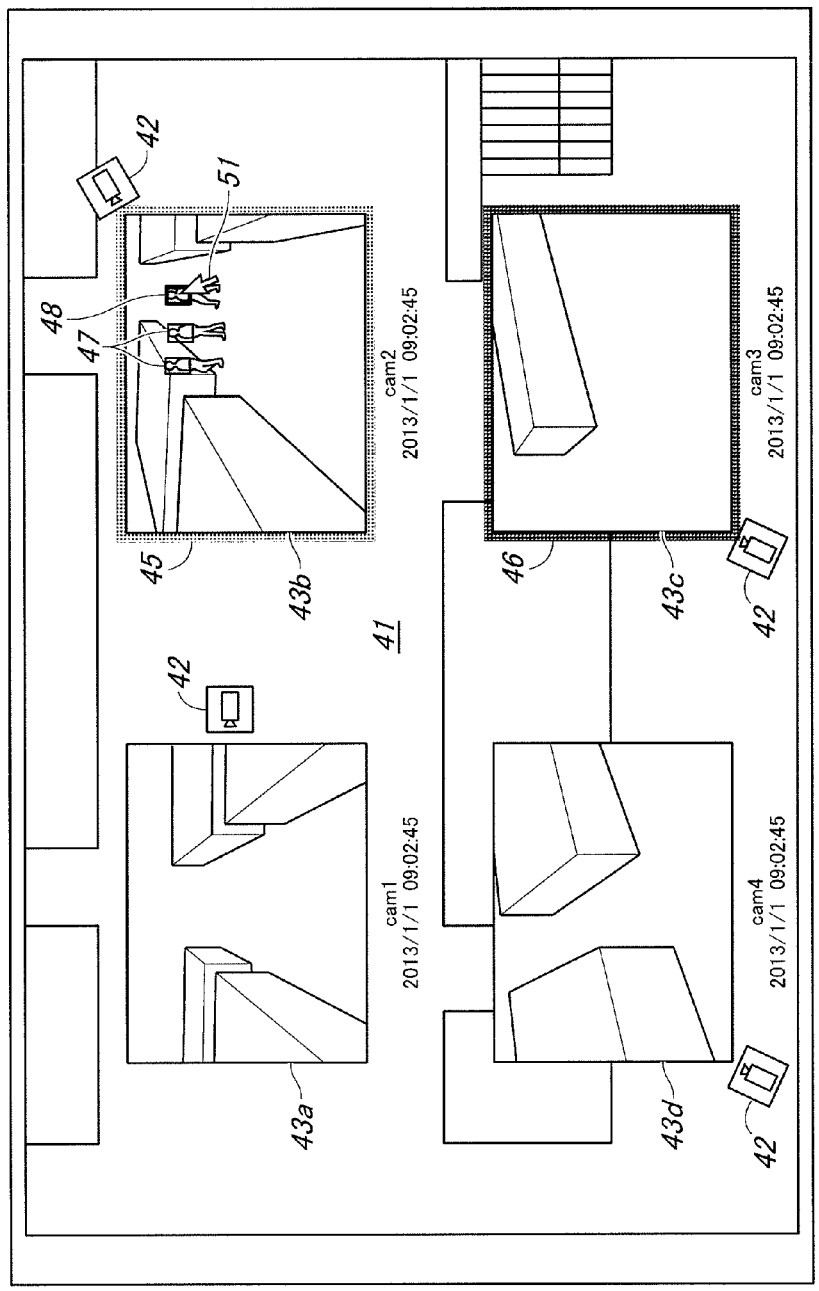
FIG. 7 is an explanatory diagram showing the monitoring screen when the person set as the target to be tracked is changed.

If it is found that the person set as the target to be tracked is incorrect, namely, the person displayed with the person detection frame 48 indicating the target to be tracked is different from the person designated as the target to be tracked on the monitoring screen shown in FIG. 5, the monitoring person performs an operation to correct the person set as the target to be tracked, as shown in FIG. 7. In this operation for correcting the target to be tracked, similarly to the operation for designating a person as the target to be tracked shown in FIG. 4, the input device 6 such as a mouse is operated to move the pointer onto the image of the person to be set as the target to be tracked and then an operation for selecting the person (a clicking operation in the case of a mouse) is performed.

When the monitoring person has performed an operation to correct the target to be tracked on the monitoring screen as described above (YES in ST105 of FIG. 9), a process of reflecting the correction operation is performed. Specifically, the target-to-be-tracked setting unit 23 performs a process of changing the target to be tracked to the person designated by the operation to correct the target to be tracked (ST106 in FIG. 9). Subsequently, the target-to-be-tracked indicating unit 33 performs a process of displaying the person detection frame 48 indicating the target to be tracked such that the person detection frame 48 is associated with the person set as the correct target to be tracked. Further, the tracing information processing unit 21 performs a process of correcting the tracing information relating to the person set as the correct target to be tracked and the person erroneously recognized as the target to be tracked.

After completion of the process of reflecting the correction operation, the control flow goes back to the step where the prediction unit 24 predicts one of the display views 43*a*-43*d* in which the person set as the target to be tracked will appear next (ST103 of FIG. 9), and the above-described processes and operations are repeated.

Figure 8:
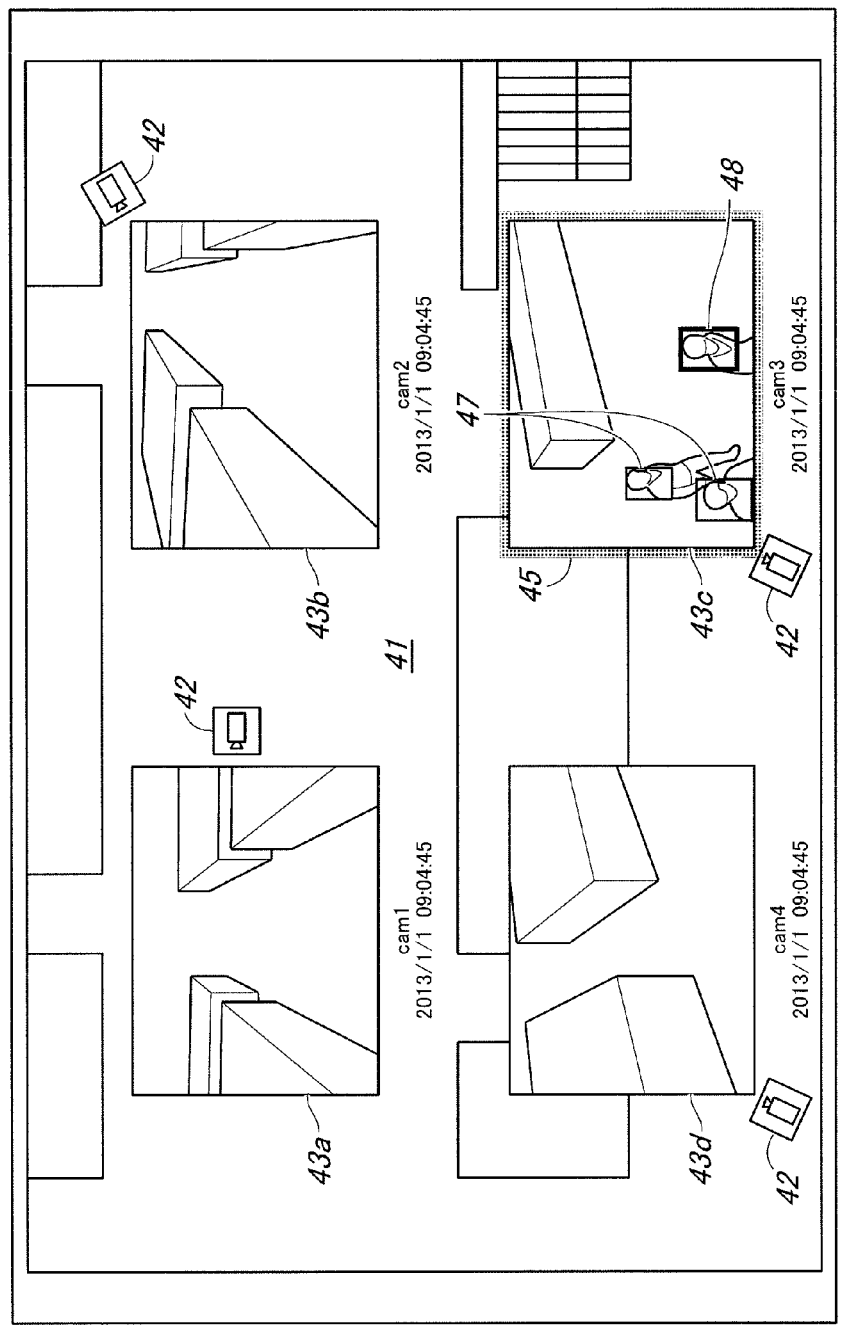
FIG. 8 is an explanatory diagram showing the monitoring screen when the person set as the target to be tracked has moved to appear in the next display view.
Figure 9:
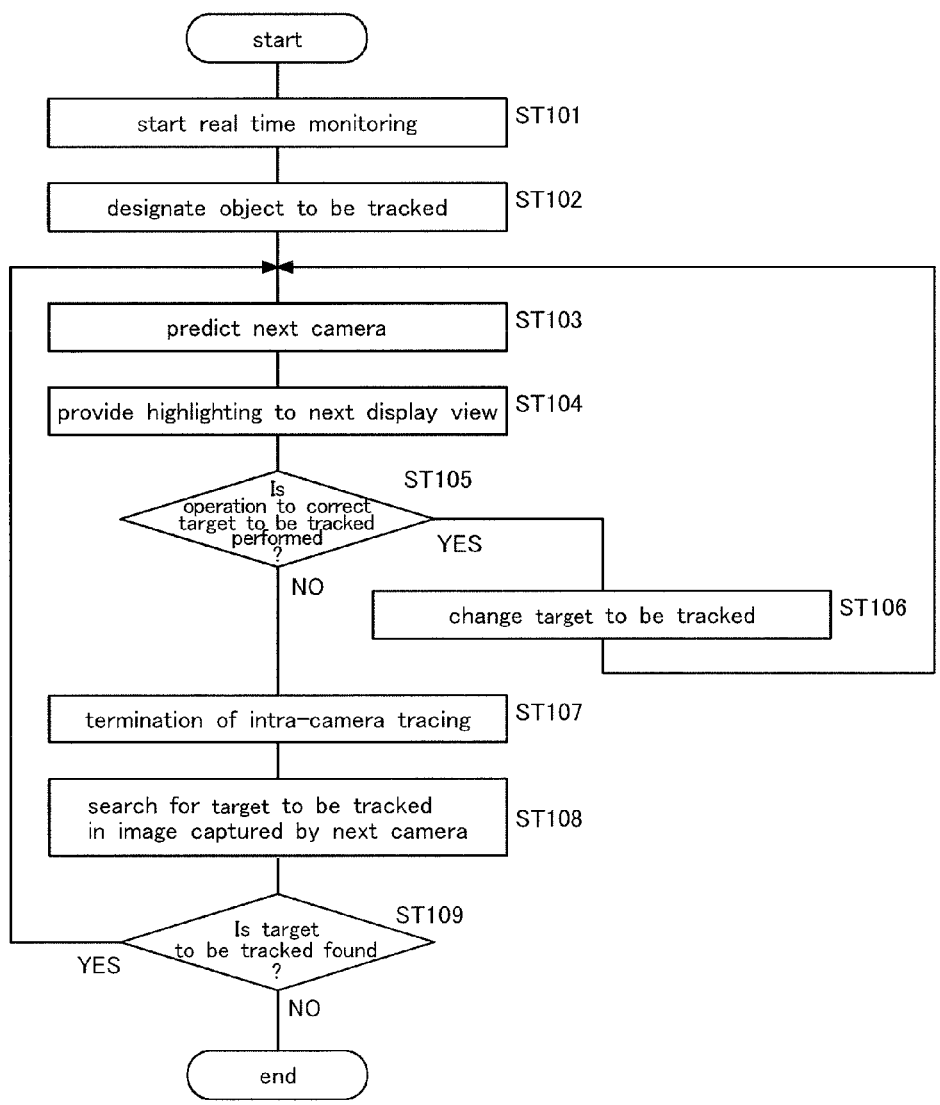
FIG. 9 is a flowchart showing a procedure of processes performed by various units of the PC 3 and operations performed by a monitoring person on the monitoring screen.

Thereafter, when the person set as the target to be tracked further moves, as shown in FIG. 8, a monitoring screen in which the person set as the target to be tracked appears in one of the display views 43*a*-43*d* that was predicted to be the next display view (the third display view 43*c* in the example shown in FIG. 8) comes to be displayed. On this monitoring screen also, the monitoring person checks whether the person set as the target to be tracked is correct. In the monitoring screen shown in FIG. 8, the person detection frame 48 indicating the target to be tracked is displayed on the person set again as the correct target to be tracked on the monitoring screen of FIG. 7, and thus, it can be confirmed that the target to be tracked has been changed back to the correct person.

As described in the foregoing, in the present embodiment, the next display view (one of the display views 43*a*-43*d* in which the person set as the target to be tracked will appear next) is predicted by the prediction unit 24 and the predicted next display view is indicated by the display view indicating unit 32 to the monitoring person, and thus, the monitoring person may have less difficulty in finding the next display view from among the multiple display views 43*a*-43*d*, whereby the burden of the monitoring person can be reduced considerably. Further, it is possible to avoid losing sight of the person to be tracked, which might be caused if it takes long time to find out the next display view. Furthermore, even when multiple persons appear in one of the display views 43*a*-43*d* of interest, the person to be tracked can be specified uniquely, and thus, it is possible to avoid erroneously indicating one of the display views 43*a*-43*d* in which a person different from the person to be tracked will appear next.

Further, in the present embodiment, the frame image 46 is displayed in the monitoring screen in association with one of the display views 43*a*-43*d* predicted as the next display view such that the frame image 46 serves as highlighting to distinguish the next display view from the other ones of the display views 43*a*-43*d*, and therefore, the monitoring person can easily find the next display view, whereby the burden of the monitoring person performing the tracking task can be reduced.

Yet further, in the present embodiment, when the person to be tracked is newly set, one of the display views 43*a*-43*d* in which the person to be tracked (more specifically, the person set as the target to be tracked) currently appears is displayed with a frame image serving as highlighting to distinguish the display view from the other ones of the display views 43*a*-43*d*, and therefore, the monitoring person can easily find the one of the display views 43*a*-43*d* in which the person to be tracked currently appears, whereby the burden of the monitoring person performing the tracking task can be reduced.

It is to be noted that in the above embodiment, the person to be tracked was designated in the first display view 43*a*, but the designation of the person (object) to be tracked may be performed in any one of the multiple display views 43*a*-43*d*, and tracking of the person to be tracked by the monitoring person is initiated from the one of the display views 43*a*-43*d* in which the person to be tracked is designated.

It is also to be noted that the person set as the target to be tracked can be incorrect as a result of a tracing error that may occur in the intra-camera tracing process performed by the intra-camera tracing processing device 4 and/or the inter-camera tracing process performed by the inter-camera tracing processing unit 5, and this tracing error is more likely to occur in the inter-camera tracing process than in the intra-camera tracing process; namely, the tracing error is more likely to occur in a process of associating the person(s) detected from the intra-camera tracing process for one display view (or camera) with the person(s) detected from the intra-camera tracing process for another display view (or camera). Therefore, a correction operation for correcting the person set as the target to be tracked is particularly required when the display view displaying the person set as the target to be tracked is switched from one of the display views 43a-43d to another, as shown in FIG. 6.

Next, temporal changes of the frame images 45, 46 shown in the display views 43a-43d of the monitoring screen will be described. FIG. 10 is an explanatory diagram showing temporal transition of states of the frame images 45, 46 shown in the display views 43a-43d of the monitoring screen.

When a person(s) is detected from the captured images by any intra-camera tracing processing device 4 and the tracing process is started, the person detection frame(s) 47 is displayed in the display views 43a-43d of the monitoring screen. If, in this state, the monitoring person performs an operation to designate a person to be tracked, a blue frame image is displayed in association with the display view in which the person set as the target to be tracked currently appears, such that the blue frame image serves as highlighting.

Then, once the process of predicting the next display view, i.e., one of the display views 43a-43d in which the person set as the target to be tracked will appear next, is performed, a red frame image is displayed in association with the predicted next display view as highlighting.

Thereafter, when the person set as the target to be tracked moves and the intra-camera tracing processing device 4 of the next camera, namely, one of the cameras 1a-1d corresponding to the next display view, detects the person in the captured image, the persons respectively detected by the intra-camera tracing processing devices 4 of the two of the cameras 1a-1d relating to the movement of the person set as the target to be tracked are associated with each other by the inter-camera tracing processing unit 5, and if this association is successful, namely, if the person designated as the target to be tracked is found detected by the intra-camera tracing processing device 4 of the next camera, the highlighting of the one of the display views 43a-43d that was predicted as the next display view is changed from the red frame image to the blue frame image (namely, the one of the display views 43a-43d that was predicted as the next display view has now become a "current" display view in which the person to be detected currently appears).

Also, when the tracing process in the intra-camera tracing processing device 4 of the one of the cameras 1a-1d that was capturing the image of the person set as the target to be tracked earlier (this camera may be referred to as an earlier camera) is terminated, the blue frame image serving as highlighting disappears from the one of the display views 43a-43d in which the person set as the target to be tracked was displayed. Therefore, if the timing of termination of the tracing process in the intra-camera tracing processing device 4 of the earlier camera is earlier than the timing of detection of the person set as the target to be tracked by the intra-camera tracing processing device 4 of the next camera, only the next display view will be displayed with the red frame image as highlighting.

Figure 11A:
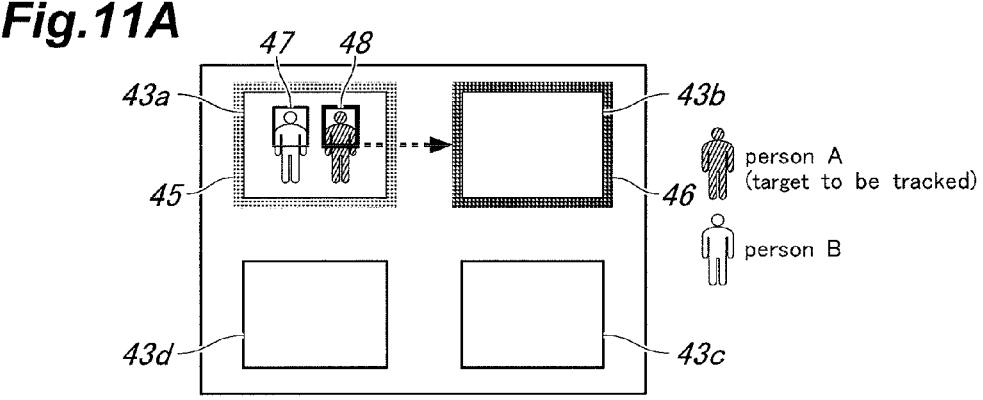
FIGS. 11A-11C are explanatory diagrams for explaining transition of states of the display views 43*a*-43*d* of the monitoring screen.
Figure 11B:
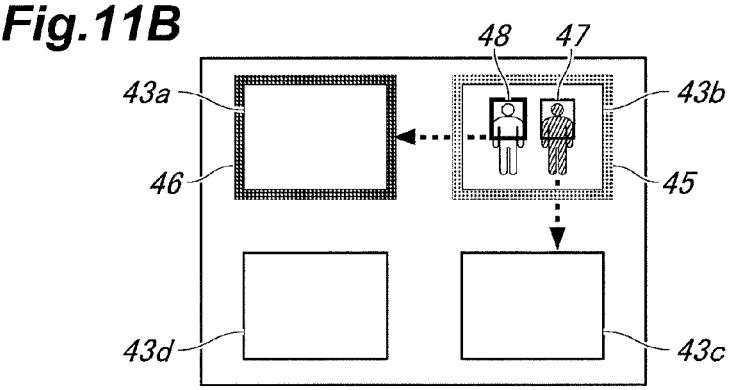
Figure 11C:
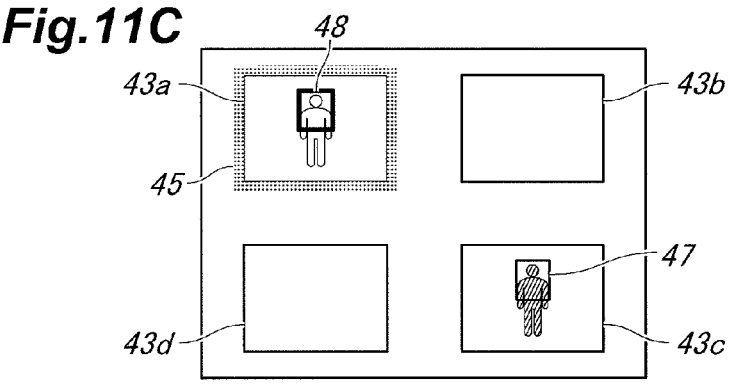

Next, a description will be given of an effect of correcting the person set as the target to be tracked when the person set as the target to be tracked becomes incorrect. FIGS. 11A-11C and FIGS. 12A-12D are explanatory diagrams for explaining transition of states of the display views 43a-43d of the monitoring screen. FIGS. 11A-11C show a case where correction of the target to be tracked is not performed while FIGS. 12A-12D show a case where correction of the target to be tracked is performed.

First, a description will be given of the case where correction of the target to be tracked is not performed, with reference to FIGS. 11A-11C. FIG. 11A shows a situation in which a person A designated as the target to be tracked and another person B, both appearing in the first display view 43a, move in the same direction. In such a situation, if an error occurs in the tracing process such that the persons A and B are replaced with each other and the person B is erroneously set as the target to be tracked, the person A designated as the target to be tracked still appears in the next display view (the second display view 43b) as shown in FIG. 11B, and thus, the person A designated as the target to be tracked is not lost from tracking.

However, if the persons A and B move in different directions as shown by arrows in FIG. 11B from this situation, the red frame image 46 indicating the display view in which the person set as the target to be tracked will appear next is displayed on the first display view 43a, and only the person B, who is not the target to be tracked, is displayed in the first display view 43a as shown in FIG. 11C, and as a result, the person A designated as the target to be tracked may be lost from tracking.

As described above, in a case where multiple persons appear in one of the display views 43a-43d at the same time, the person designated as the target to be tracked may be displayed in the predicted next display view (or one of the display views 43a-43d which was predicted will next display the person set as the target to be tracked). However, if an error in the tracing information is left uncorrected, when the multiple persons move in different directions, the person designated as the target to be tracked may not be displayed in the predicted next display view, and thus, the person designated as the target to be tracked may be lost from tracking.

Next, a description will be given of the case of the present embodiment where correction of the target to be tracked is performed, with reference to FIGS. 12A-12D. FIGS. 12A and 12B are the same as FIGS. 11A and 11B, respectively, of the above example. As shown in FIG. 12B, in the second display view 43b, the person detection frame 48 indicating the target to be tracked is displayed on the person B who is not the target to be tracked, and therefore, the monitoring person can notice that the person set as the target to be tracked is incorrect, namely, the target to be tracked is set to the person B who is different from the person A designated as the target to be tracked.

Then, as shown in FIG. 12C, the monitoring person performs, on the second display view 43b, an operation of correcting the target to be tracked; namely, changing the target to be tracked, which is set to the person B due to an error in the tracing process, to the person A. Thereby, even if the persons A and B move in different directions as shown by arrows in FIG. 12C, the red frame image 46 indicating the display view in which the person set as the target to be tracked will appear next is displayed on the third display view 43c, in which, as shown in FIG. 12D, the person A designated as the target to be tracked appears, and hence, the person A designated as the target to be tracked will not be lost from tracking.

As described in the foregoing, in the present embodiment, the person set as the target to be tracked is indicated by the person detection frame 48 in the display views 43a-43d, and thus, the monitoring person can notice if the person set as the target to be tracked is incorrect, namely, a person different from the person designated as the target to be tracked is set as the target to be tracked due to an error in the tracing information. Then, upon noticing the incorrect setting of the target to be tracked, the monitoring person can correct the setting of the target to be tracked, so that in the monitoring screen displayed thereafter, the person designated as the target to be tracked will appear in the predicted next display view without fail, and the tracking can be continued without losing sight of the person designated as the target to be tracked. Further, when the person set as the target to be tracked is displayed in the predicted next display view, the monitoring person can promptly check the displayed person, and therefore, the monitoring person can promptly note incorrect setting of the target to be tracked, if any, and correct the setting of the target to be tracked without fail.

It is to be noted that in the examples shown in FIGS. 6, 11A-11C and 12A-12D, a description was made of a case where an error that two persons are replaced with each other occurs, but there may be a case where the tracing process of the person set as the target to be tracked is interrupted, so that the person set as the target to be tracked apparently disappears, namely, the person detection frame 48 indicating the target to be tracked becomes undisplayed on the person set as the target to be tracked in the display views 43a-43d. In such a case, similarly to when performing the operation for designating the target to be tracked shown in FIG. 4, the monitoring person may perform an operation of designating the person desired to be tracked who is appearing in the display views 43a-43d. Thereby, it is possible to continue the tracking thereafter.

In the foregoing, the present invention has been described in terms of concrete embodiments thereof. However, these embodiments are provided for illustrative purposes and the present invention is not limited by the embodiments. It is also to be noted that not all of the structural elements of the tracking assistance device, tracking assistance system and tracking assistance method as shown in the embodiments of the present invention are necessarily indispensable, and they may be selectively used as appropriate without departing from the spirit of the present invention.

For example, in the foregoing embodiment, a description was given of an exemplary case in which the invention was applied to a retail store such as a supermarket. However, the present invention may be applied to a commercial establishment other than a retail store, such as a restaurant, which can be a casual dining restaurant, etc. Further, the present invention may be applied to a facility other than a commercial establishment, such as a plant or the like.

Further, in the foregoing embodiment, a description was given of an example in which a person was tracked as a moving object. However, a configuration can be made to track a moving object other than a person, such as a vehicle, which may be an automobile, bicycle, etc.

Further, in the foregoing embodiment, a description was given of an example in which four cameras 1a-1d are mounted and four display views 43a-43d for respectively displaying the captured images taken by the cameras 1a-1d are arranged in the monitoring screen, but the number of the cameras 1a-1d and that of the display views 43a-43d are not limited thereto. The configuration according to the present embodiment can be particularly advantageous for a larger number of the display views 43a-43d.

Further, in the foregoing embodiment, to highlight the display views 43a-43d in the monitoring screen, the frame images 45, 46 colored with predetermined colors are each displayed on an outer periphery of one of the display views 43a-43d to be highlighted, but highlighting is not limited to such an embodiment, and it is possible to display a predetermined image such as a mark inside of in the vicinity of a desired one of the display views 43a-43d and/or display an image of an arrow connecting two of the display views 43a-43d.

Further, in the foregoing embodiment, description was made of an example in which the intra-camera tracing process was performed by the intra-camera tracing processing devices 4 and the inter-camera tracing process and the tracking assistance process were performed by the PC 3 as shown in FIG. 3. However, the intra-camera tracing process may also be performed by the PC 3. It is also possible to configure each of the cameras 1a-1d to include an intra-camera tracing process unit. Further, the inter-camera tracing processing unit 5 may be configured as a tracing processing device separate from the PC 3. Still further, though each of the cameras 1a-1d was shown in the drawings as a box style camera having a limited view angle, the cameras 1a-1d are not limited thereto and it is also possible to use an omnidirectional camera(s) which can capture a wide-range image.

Further, in the foregoing embodiment, the intra-camera tracing process, inter-camera tracing process and tracking assistance process were performed by a device set up at the store, but these processes may be performed by the PC 11 set up at the management office or a cloud computer 12 forming a cloud computing system, as shown in FIG. 1. Further, these necessary processes may be performed by cooperation of multiple information processing devices, in which case, the multiple information processing devices are configured to be able to communicate or share information with each other via a communication medium such as an IP network or LAN. Thereby, the multiple information processing devices jointly executing the necessary processes constitute a tracking assistance system.

In this case, it is preferred that the device set up at the store be configured to perform at least the intra-camera tracing process or the inter-camera tracing process. In such a structure, since the information obtained by the intra-camera tracing process or the inter-camera tracing process has a small amount of data, even if the remaining processes are performed by an information processing device set up at a place other than the store, such as the PC 11 set up at the management office, the communication load can be small, and thus, it is easy to operate the system in the form of a wide area network.

It may be also preferred that the cloud computer 12 be configured to perform at least the intra-camera tracing process or the inter-camera tracing process. In such a structure, although the intra-camera tracing process and the inter-camera tracing process require a large amount of computation, they are achieved by the information processing device constituting a cloud computing system, and therefore, it is not necessary to prepare a high-speed information processing device on the use side, namely at the store or the like. Further, since the remaining processes require a small amount of computation, the remaining processes can be performed as extended functions of an information processing device set up at the store to serve as a sales information management device, and this can reduce the cost born by the user.

The cloud computer 12 may be configured to perform the entirety of the necessary processes. In such a structure, it becomes possible to view the tracking state on a mobile terminal such as a smartphone 13 in addition to the PC 3 set up at the store and the PC 11 set up at the management office, and this allows a user to view the tracking state not only at the store or the management office but also at any other place, such as a place the user is visiting on business.

The tracking assistance device, tracking assistance system and tracking assistance method according to the present invention can properly perform an assistance process to reduce the burden of a monitoring person in tracking a person being monitored while watching captured images taken by multiple cameras and displayed in the monitoring screen, so that the monitoring person can continue tracking without losing sight of the person being monitored, and thus, are useful as a tracking assistance device, a tracking assistance system and a tracking assistance method for assisting a monitoring person in tracking a moving object to be tracked by displaying on a display device a monitoring screen in which multiple display sections are arranged to display in real time captured images taken by respective cameras.

The invention claimed is:

1. A tracking assistance device for assisting a monitoring person in performing a task of tracking a moving object to be tracked by displaying a monitoring screen on a display device, the monitoring screen including a plurality of display views displaying in real time captured images taken by respective cameras, the plurality of display views arranged on a map image representing a monitored area in accordance with an actual arrangement of the cameras, the tracking assistance device comprising:
 a target-to-be-tracked setter that, in response to an input operation performed by the monitoring person on one of the plurality of display views to designate a moving object to be tracked, sets the designated moving object as a target to be tracked;
 a target-to-be-tracked indicator that, based on tracing information obtained by processing the captured images, indicates the moving object set as the target to be tracked in each of the plurality of display views in which the moving object set as the target to be tracked appears;
 a predictor that predicts a next display view in which the moving object set as the target to be tracked will next appear based on the tracing information; and
 a display view indicator that indicates the next display view predicted by the predictor on the monitoring screen,
 wherein the target-to-be-tracked indicator provides first highlighting to highlight a moving object frame associated with the moving object set as the target to be tracked and the display view indicator provides second highlighting to highlight a display frame associated with the next display view predicted by the predictor.

2. The tracking assistance device according to claim 1, further comprising:
 a controller that, when the moving object is set as the target to be tracked and when an indication of the target to be tracked by the target-to-be-tracked indicator is noted as being incorrect by an input operation performed by the monitoring person, causes the target-to-be-tracked setter to perform a process of changing the moving object set as the target to be tracked.

3. The tracking assistance device according to claim 1, wherein, when the moving object is set anew by the target-to-be-tracked setter as the target to be tracked, the display view indicator provides third highlighting to a display view in which the moving object set as the target to be tracked currently appears, such that the display view is distinguished from others of the plurality of display views.

4. A tracking assistance system for assisting a monitoring person in performing a task of tracking a moving object to be tracked by displaying a monitoring screen on a display device, the monitoring screen including a plurality of display views displaying in real time captured images taken by respective cameras, the plurality of display views arranged on a map image representing a monitored area in accordance with an actual arrangement of the cameras, the tracking assistance system comprising:
 the cameras that take the captured images of the monitored area;
 the display device that displays the monitoring screen; and
 a plurality of information processing devices,
 wherein the plurality of information processing devices jointly include:
  a tracing processor that traces a moving object detected from the captured images and generates tracing information of the moving object;
  a target-to-be-tracked setter that, in response to an input operation performed by the monitoring person on one of the plurality of display views to designate a moving object to be tracked, sets the designated moving object as a target to be tracked;
  a target-to-be-tracked indicator that, based on the tracing information obtained from the tracing processor, indicates the moving object set as the target to be tracked in each of the plurality of display views in which the moving object set as the target to be tracked appears;
  a predictor that predicts a next display view in which the moving object set as the target to be tracked will next appear based on the tracing information; and
  a display view indicator that indicates the next display view predicted by the predictor on the monitoring screen,
 wherein the target-to-be-tracked indicator provides first highlighting to highlight a moving object frame associated with the moving object set as the target to be tracked and the display view indicator provides second highlighting to highlight a display frame associated with the next display view predicted by the predictor.

5. A tracking assistance method for assisting a monitoring person in performing a task of tracking a moving object to be tracked by displaying a monitoring screen on a display device, the monitoring screen including a plurality of display views for displaying in real time captured images taken by respective cameras, the plurality of display views arranged on a map image representing a monitored area in accordance with an actual arrangement of the cameras, the tracking assistance method comprising:
 setting, in response to an input operation performed by the monitoring person on one of the plurality of display views to designate a moving object to be tracked, the designated moving object as a target to be tracked;
 indicating, based on tracing information obtained by processing the captured images, the moving object set as the target to be tracked in each of the plurality of display views in which the moving object set as the target to be tracked appears;
 predicting a next display view in which the moving object set as the target to be tracked will next appear based on the tracing information; and
 indicating the next display view predicted by the predicting on the monitoring screen,
 wherein the indicating of the moving object set as the target to be tracked provides first highlighting to highlight a moving object frame associated with the moving object set as the target to be tracked and the indicating of the next display view provides second highlighting to highlight a display frame associated with the next display view predicted by the predicting.

6. The tracking assistance device according to claim 2, wherein, when the moving object is set anew by the target-to-be-tracked setter as the target to be tracked, the display view indicator provides third highlighting to a display view in which the moving object set as the target to be tracked currently appears, such that the display view is distinguished from others of the plurality of display views.

* * * * *